United States Patent
Lee et al.

(10) Patent No.: US 10,944,232 B2
(45) Date of Patent: Mar. 9, 2021

(54) TERAHERTZ LASERS AND TERAHERTZ EXTRACTION

(71) Applicant: Macquarie University, New South Wales (AU)

(72) Inventors: Andrew Lee, North Ryde (AU); Helen M. Pask, North Ryde (AU); David James Spence, North Ryde (AU)

(73) Assignee: Macquarie University, New South Wales (AU)

( * ) Notice: Subject to any disclaimer, the term of this patent is extended or adjusted under 35 U.S.C. 154(b) by 0 days.

(21) Appl. No.: 16/495,598

(22) PCT Filed: Mar. 23, 2018

(86) PCT No.: PCT/AU2018/050271
§ 371 (c)(1),
(2) Date: Sep. 19, 2019

(87) PCT Pub. No.: WO2018/170555
PCT Pub. Date: Sep. 27, 2018

(65) Prior Publication Data
US 2020/0014166 A1   Jan. 9, 2020

(30) Foreign Application Priority Data

Mar. 24, 2017 (AU) .............................. 2017901057

(51) Int. Cl.
*H01S 3/30* (2006.01)
*H01S 1/02* (2006.01)
(Continued)

(52) U.S. Cl.
CPC .............. *H01S 1/02* (2013.01); *H01S 3/1083* (2013.01); *H01S 3/1086* (2013.01); *H01S 3/11* (2013.01);
(Continued)

(58) Field of Classification Search
CPC ........ H01S 1/02; H01S 3/1086; H01S 3/1083; H01S 3/1611; H01S 3/1608;
(Continued)

(56) References Cited

U.S. PATENT DOCUMENTS

| 7,550,734 B1 * | 6/2009 | Lee ..................... B82Y 20/00 |
| | | 250/370.12 |
| 2007/0160093 A1 * | 7/2007 | Nishizawa ............ G02F 1/3534 |
| | | 372/21 |

(Continued)

FOREIGN PATENT DOCUMENTS

CN            103794293 B       1/2017

OTHER PUBLICATIONS

Dhillon et al., "The 2017 Terhhertz Science and Technology Roadmap", Journal of Applied Physics, vol. 50, No. 4, 2017.
(Continued)

*Primary Examiner* — Kinam Park
(74) *Attorney, Agent, or Firm* — Caesar Rivise, PC (57) ABSTRACT

A frequency electromagnetic radiation generation system including: a non linear crystal producing THz frequency electromagnetic radiation; a fundamental beam that interacts with the non linear crystal thereby emitting a THz frequency electromagnetic radiation emission; a silicon intermediary coupled to the non linear crystal for output channeling the THz frequency electromagnetic radiation emission to an output environment; the system utilising a fundamental beam which has a photon energy below the bandgap energy of silicon.

22 Claims, 8 Drawing Sheets

(51) Int. Cl.
  *H01S 3/108* (2006.01)
  *H01S 3/11* (2006.01)
  *H01S 3/16* (2006.01)
(52) U.S. Cl.
  CPC ............ *H01S 3/1608* (2013.01); *H01S 3/1611* (2013.01); *H01S 3/1616* (2013.01); *H01S 2302/00* (2013.01); *H01S 2302/02* (2013.01)
(58) Field of Classification Search
  CPC ...... H01S 3/1616; H01S 3/11; H01S 2301/02; H01S 2301/00
  See application file for complete search history.

(56) References Cited

U.S. PATENT DOCUMENTS

| | | | | |
|---|---|---|---|---|
| 2007/0280303 | A1* | 12/2007 | Koch | H01S 5/32 372/4 |
| 2008/0151349 | A1* | 6/2008 | Hochberg | H01S 1/02 359/258 |
| 2010/0135337 | A1* | 6/2010 | Belkin | H01S 1/02 372/4 |
| 2010/0195675 | A1 | 8/2010 | Moloney et al. | |
| 2011/0032600 | A1 | 2/2011 | Kondo et al. | |
| 2011/0057109 | A1 | 3/2011 | Guo et al. | |
| 2013/0010351 | A1* | 1/2013 | Vermeulen | G02F 1/3544 359/334 |
| 2013/0272323 | A1* | 10/2013 | Kim | H01S 1/02 372/21 |
| 2013/0294467 | A1* | 11/2013 | Moloney | H01S 5/0092 372/20 |
| 2014/0191131 | A1 | 7/2014 | Uchida et al. | |
| 2015/0316832 | A1 | 11/2015 | Sato | |
| 2019/0154575 | A1* | 5/2019 | Peng | G01J 3/021 |

OTHER PUBLICATIONS

Kawase et al., "Coherent Tunable THz-wave Generation from LiNbO3 With Monolithic Grating Coupler", Applied Physics Letters, vol. 68, No. 18, pp. 2483-2485, Apr. 29, 1996.

Kawase et al., "Terahertz Wave Parametric Source", Journal of Physics D: Applied Physics, vol. 34, 2002, R1-R14.

Lee, et al., "Continuous Wave, Frequency-tunable Terahertz Laser Radiation Generated via Stimulated Polariton Scattering", Optics Letters, vol. 39, No. 3, pp. 442-445, Feb. 1, 2014.

Lee et al., "Tunable THz Polariton Laser Based on 1342 nm Wavelength for Enhanced Terahertz Wave Extraction", Optics Letters, vol. 42, No. 14, pp. 2691-2694, Jul. 15, 2017.

Miyamoto et al., "Broadband Terahertz Light Source Pumped by a 1 μm Picosecond Laser", Applied Physics B, Lasers and Optics, vol. 110, No. 3, pp. 321-326, 2013.

Rice et al., "Terahertz Optical Rectification from 110-Zinc-Blende Crystals", Applied Physics Letters, vol. 64, No. 11, pp. 1324-1326, Mar. 14, 1994.

Shikata et al., "Tunable Terahertz-Wave Parametric Oscillators Using LiNbO3 and MgO: LiNbO3 Crystals", IEEE Transactions on Microwave Theory and Techniques, vol. 48, No. 4, pp. 653-661, Apr. 2000.

Suizu et al., "Extremely Frequency-Widened Terahertz Wave Generation Using Cherenkov-type Radiation", Optics Express, vol. 17, No. 8, pp. 6676-6681, Apr. 13, 2019.

International Search Report for corresponding PCT Application No. PCT/AU2018/050271 dated May 11, 2018.

English Abstract of CN103794293.

Supplementary European Search Report for related European Patent Application No. EP18772051.1 dated Nov. 23, 2020.

* cited by examiner

TERAHERTZ LASERS AND TERAHERTZ EXTRACTION

CROSS REFERENCE TO RELATED APPLICATIONS

This United States national phase application claims the benefit under 35 U.S.C. § 371 of PCT Application No. PCT/AU20186/050271 filed on Mar. 23, 2018, which in turn claims priority to Australian Application Serial No. 2017901057 filed on Mar. 24, 2017 and all of whose entire disclosures are incorporated by reference herein.

FIELD OF THE INVENTION

The present invention is directed to emission sources which generate terahertz (THz) frequency electromagnetic radiation. In particular, in one instance, the present invention is related to an intracavity solid state laser via the non-linear stimulated polariton scattering (SPS) process.

BACKGROUND OF THE INVENTION

Any discussion of the background art throughout the specification should in no way be considered as an admission that such art is widely known or forms part of common general knowledge in the field.

THz frequency electromagnetic radiation emissions, such as those generated by THz laser sources are increasingly important in many fields, including chemical and biological sensing, spectroscopy, detection of explosives and other contraband materials, disease diagnosis, quality control in pharmaceuticals, and even remote-sensing in astronomy to understand star and galaxy formation. For a review of some of the uses of THz frequency electromagnetic radiation sources, reference is made to "The 2017 terahertz science and technology roadmap", Journal of Physics D: Applied Physics, Volume 50, Number 4

In any THz frequency electromagnetic radiation emission source, it is desirable to maximise the output power of the emission source.

Terahertz Stimulated Polariton Scattering (SPS) lasers are known as one form of THz frequency electromagnetic radiation emission source. For example, see Lee A. J, Pask H. M. Continuous wave, frequency-tunable terahertz laser radiation generated via stimulated polariton scattering; Opt Lett. 2014 Feb. 1; 39(3):442-5. doi: 10.1364/OL.39.000442; the contents of which are incorporated by cross reference. Other published examples include, Kawase K, Sato M, Taniuchi T, Ito H, Coherent tunable THz-wave generation from $LiNbO_3$ with monolithic grating coupler; Appl. Phys. Lett. 1996 March 68:2483. doi:10.1063/1.115828, which describes a terahertz parametric generator utilizing SPS; Shikata J, Kawase K, Karino K, Taniuchi T, Ito H, Tunable terahertz-wave parametric oscillators using $LiNbO_3$ and $MgO:LiNbO_3$ crystals; IEEE Transactions on Microwave Theory and Techniques 2000 April:48(4):653, which describes a terahertz parametric oscillator utilizing SPS. Other laser-based THz generation techniques include the use of Cherenkov radiation, see Suizu K, Koketsu K, Shibuya T, Tsutsui T, Akiba T, Kawase K, Extreme frequency-widened terahertz wave generation using Cherenkov-type radiation; Optics Express 2009; 17(8):6676-6681. doi: 10.1364/OE.17.006676; Optical rectification, for example, Rice A, Jin Y, Ma F, Zhang X. C, Terahertz optical rectification from <110> zinc-blende crystals; Applied Physics Letters 1994: 64:1324. doi: 10.1063/1.111922; and difference frequency generation, for example, Miyamoto K, Lee A, Saito T, Akiba T, Suizu K, Omatsu T Broadband terahertz light source pumped by a 1 μm picosecond laser; Applied Physics B 2013; 110(3):321-6. doi 10.1007/s00340-013-5359-8

Figure 1:
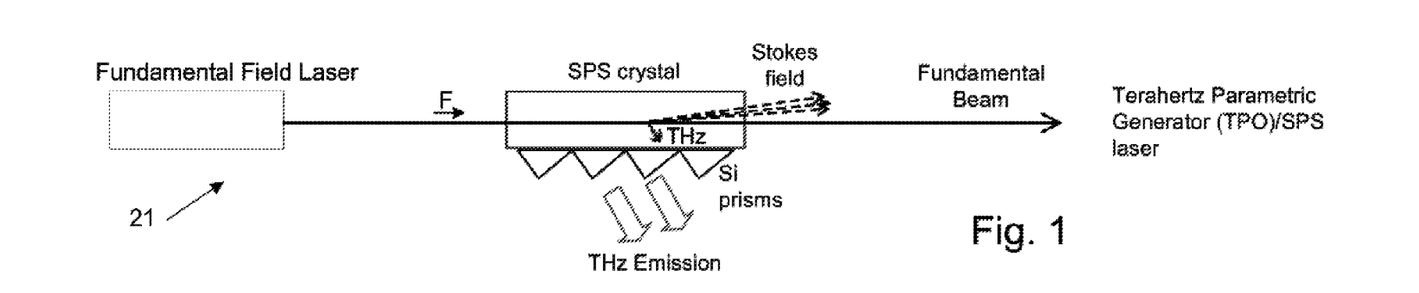
FIG. 1 to FIG. 3 illustrates schematically various known forms of THz generation.
Figure 2:
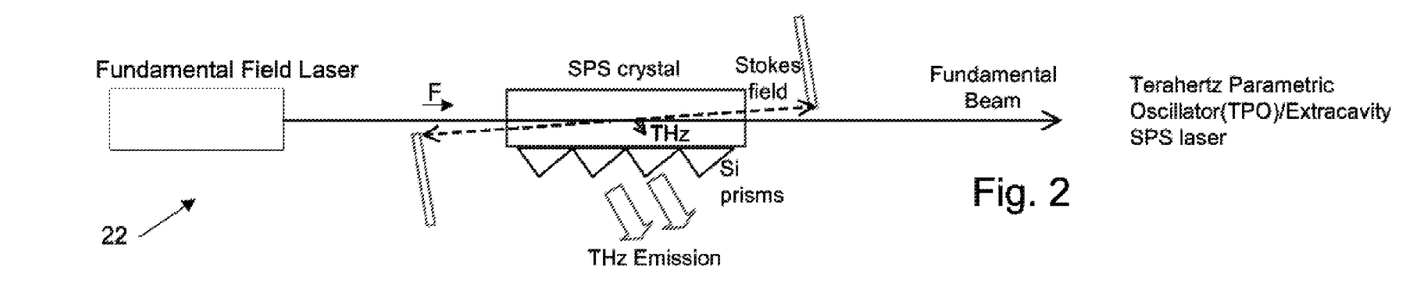
Figure 3:
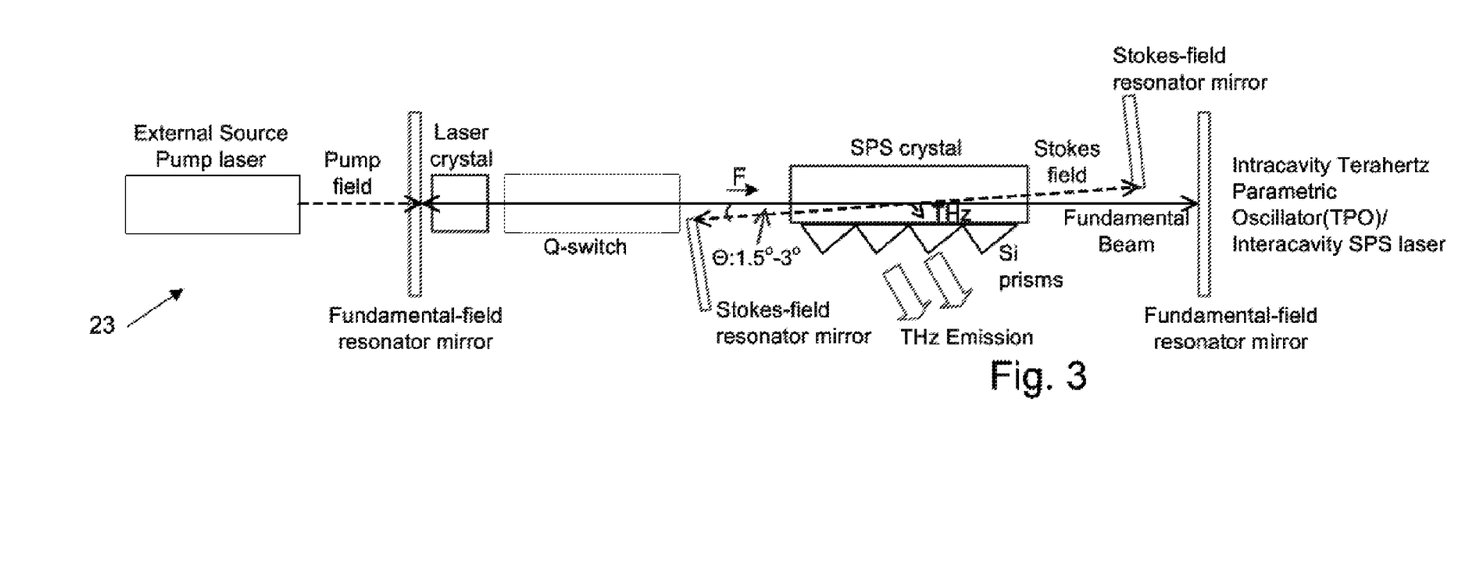

FIG. 1 to FIG. 3 illustrate schematically layouts of different SPS laser configurations. FIG. 1 illustrates the SPS generator (or Terahertz Parametric Generator (TPG)) 21; FIG. 2 illustrates the extracavity SPS laser (or Terahertz Parametric Oscillator (TPO)) 22; and FIG. 3 illustrates the intracvity SPS laser (or Intracavity Terahertz Parametric Oscillator (TPO)) 23. In the figures a "pump" field is defined as the laser field originating from the pump laser. The "fundamental" field is the field which is non-linearly converted via the SPS process into the Stokes and THz fields; in the case of a TPG and TPO this is the same as the pump field; in the case of the intracavity SPS laser, this is the field generated by the intracavity laser crystal. The "Stokes" field is generated within the SPS crystal with the THz field, during the SPS process.

The SPS process is a non-linear optical process for generating THz radiation. Other non-linear methods which can be used to generate THz radiation using similar laser configurations include difference frequency generation (DFG), optical rectification and via nonlinear Cerenkov emission. In all these non-linear processes, phase matching is used to appropriately tune the laser field wavelengths/frequencies. Typically the fields take the form of a laser beam, which may or may not be resonated within a laser cavity/resonator. Phase matching is a process whereby a phase relation is established between co-propagating fields. In the case of SPS lasers, what is critical is that energy and momentum conservation takes place, wherein the photon energy of the "fundamental" field equals the sum of energies of the "Stokes" and "THz" fields. Similarly the wavevector of the "fundamental" field equals the sum of the "Stokes" and "THz" field wavevectors.

Figure 4:
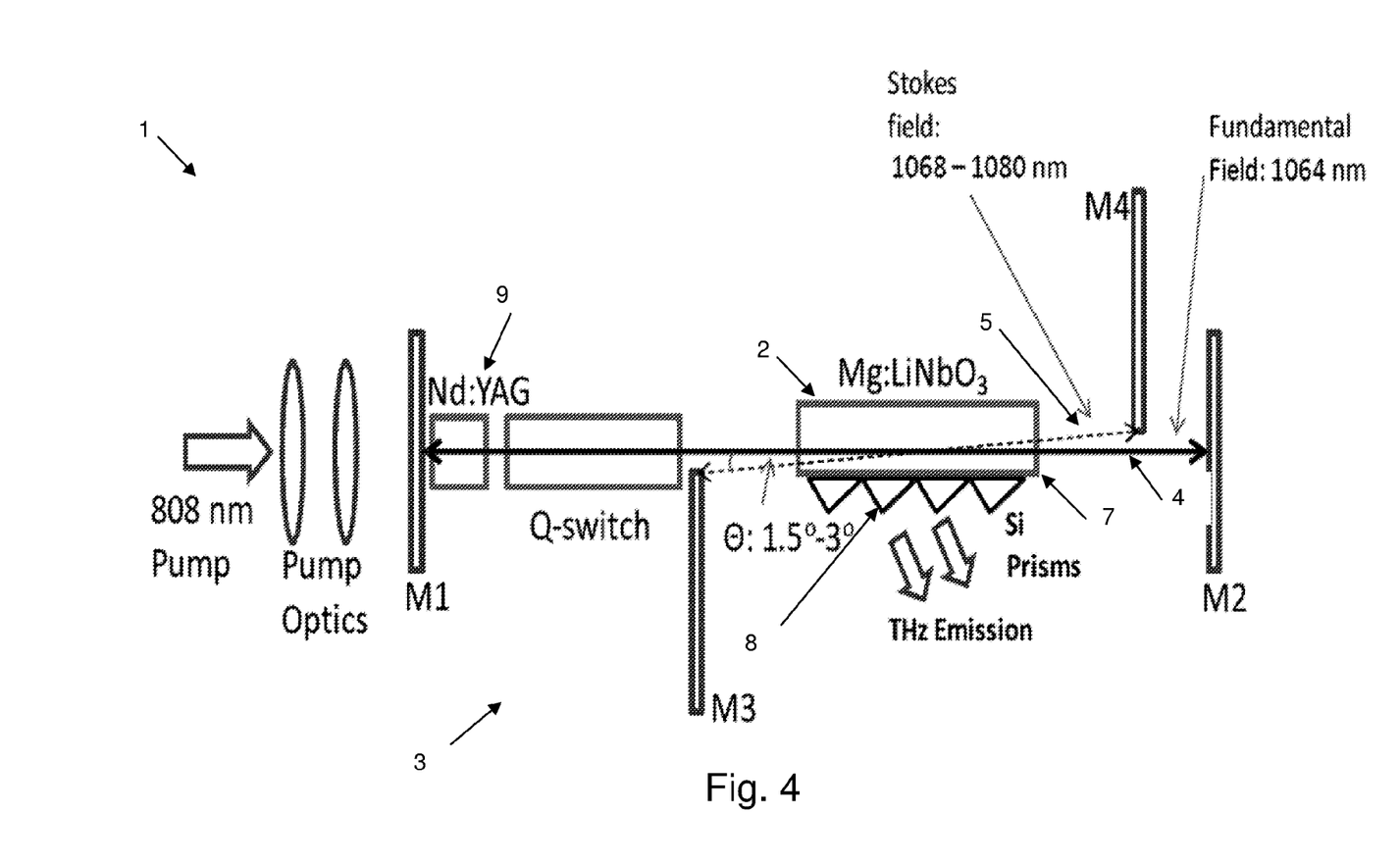
FIG. 4 illustrates schematically a known form of SPS THz laser.

FIG. 4 illustrates schematically an example experimental arrangement of an intracavity SPS laser 1. In an intracavity SPS laser 1, an SPS-active crystal (typically MgO-doped lithium niobate (LN)) 2 is placed within the cavity 3 of a solid state laser (typically a Q-switched Nd:YAG system). This is done so as to access the high intensity "fundamental" field 4 (at 1064 nm) which is required to achieve threshold for the non-linear SPS process. Other crystals and laser sources may also be used, including to access different parts of the THz spectrum.

SPS-THz lasers have also been demonstrated in external-cavity configurations (such as the TPG/TPO) but generally rely on the use of large, high-power lasers. Intracavity systems are on the other hand, are smaller and more efficient. In these intracavity lasers, another cavity is formed around the LN crystal to oscillate another field, called the "Stokes" (this wavelength typically tunes from ~1068-1080 nm). The SPS process converts some of the fundamental field 4 into the Stokes field 5 and the desired THz field.

By altering the angle of the Stokes cavity 5 relative to the fundamental cavity 4 (typically from ~1.5-3 degrees when LN is used), thereby altering the phase matching angle within the nonlinear crystal, tuning of the Stokes wavelength and the THz field frequency can be achieved.

The THz field can comprise a discrete THz frequency, or it can be tuned to be within a range of THz frequencies that lies between about 1-10 THz. In the case of SPS in LN, the THz emission typically tunes from ~1 THz-4 THz. Other tuning ranges are obtained in other systems. These systems are one of only a few which can generate tunable THz frequency electromagnetic radiation with reasonably high (~μW) level average powers.

Figure 5:
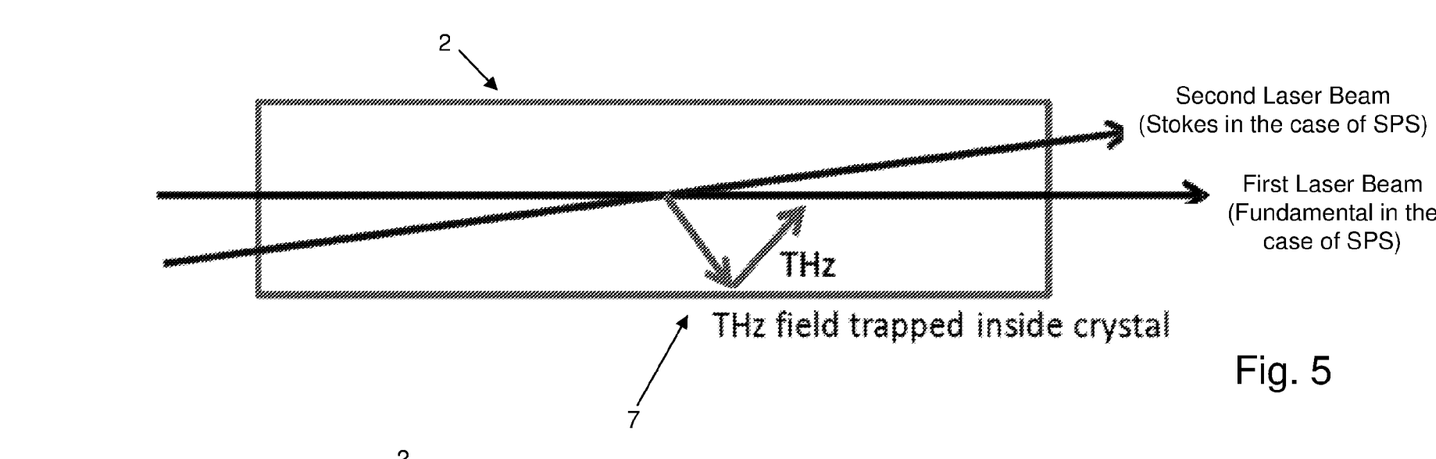
FIG. 5 illustrates schematically the process of internal reflection of THz radiation.

Due to the angle at which the THz field is generated within the LN crystal 2, it will undergo total internal reflection at the LN/air interface 7. Such an arrangement is illustrated in FIG. 5. Similar total internal reflections occur when other nonlinear crystals are used.

Figure 6:
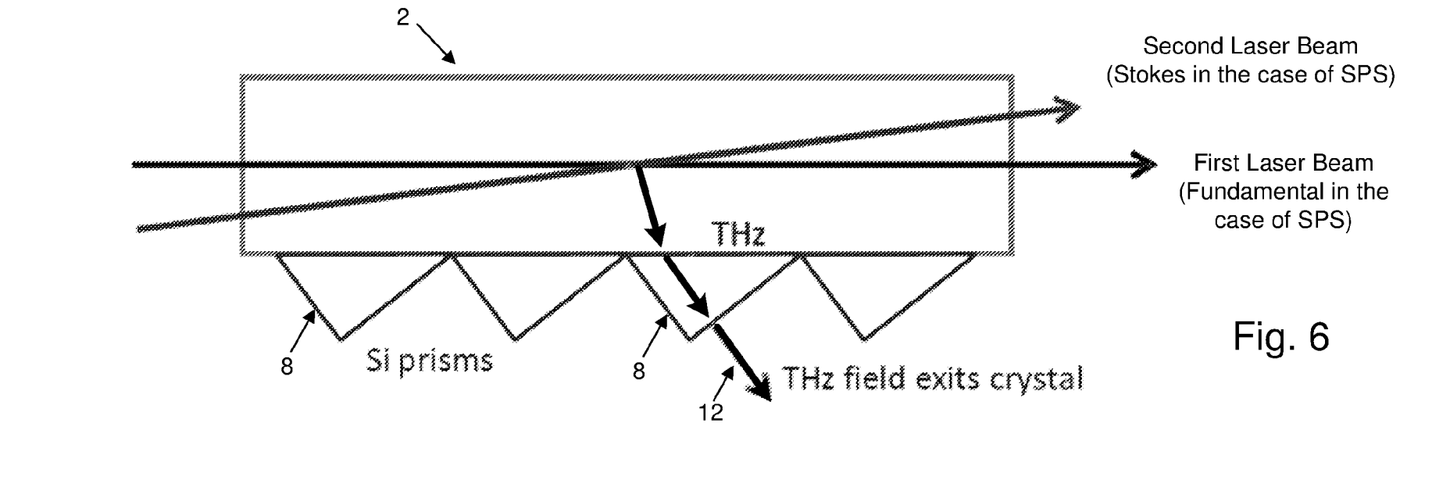
FIG. 6 illustrates schematically the utilisation of Si prisms for the extraction of THz radiation.

As shown in FIG. 6, to avoid this and effectively out-couple the THz radiation 12 from the crystal, high-resistivity Si prisms 8 are used as an intermediary between the LN crystal 12 and air. An additional layer (such as air or polymer for example) may also be present between the LN crystal and Si prism.

Si is a material which has a refractive index appropriate to enable out-coupling of the THz field across a broad THz frequency range, while maintaining inherently low THz absorption relative to other materials. High resistivity Si typically has lower THz absorption relative to other forms of silicon.

One significant issue however is that free carriers in the form of electrons and holes can be induced within the Si prisms 8 through the photoelectric effect (by photons with energy above the band gap of Si hitting the Si surface). These free-carriers act to absorb the THz radiation which propagates through the Si prisms 8. K. Kawase, J. Shikata, and I. Hiromasa, "Terahertz wave parametric sources," J. Phys. D Appl. Phys. 34, R1-R14 (2001).

It so happens that the photon energy of the fundamental and Stokes photons (1064 nm=1.16 eV; 1080 nm=1.15 eV) are above the band gap of Si (1.11 eV) and hence cause free carrier generation. It is well known that the energy and wavelength are related by the formula: $E=hc/\lambda$. These fundamental and Stokes photons are scattered within the laser system through a number of means such as imperfections or impurities within the laser and LN crystal, and from imperfect end-faces and mirrors, and simply expanding or contracting resonator modes, etc. Due to tolerances in manufacturing of these components, it is impossible to totally avoid scattering of the laser radiation in these systems.

It is however, possible to prevent some of this scattered laser radiation impinging on the surface of the Si prisms by using blocking elements such as razor blades or additional prisms. While this solution may help to resolve the issue of scattered laser radiation hitting the Si prism externally, it does not solve issues with scattering internally within the LN crystal and free-carriers being generated at the surface of the Si prisms which are adhered to the LN crystal. In some example arrangements, free-carrier absorption effect in Si prisms can present total loss of the THz field.

SUMMARY OF THE INVENTION

It is an object of the invention, in its preferred form to provide an improved form of power extraction from a THz frequency electromagnetic radiation emission source.

In accordance with a first aspect of the present invention, there is provided a THz frequency electromagnetic radiation generation system including: a non linear crystal producing THz frequency electromagnetic radiation; a fundamental beam that interacts with the non linear crystal thereby enabling a THz frequency electromagnetic radiation emission; a silicon intermediary coupled to the non linear crystal for output channelling the THz frequency electromagnetic radiation emission to an output environment; the system utilising a fundamental beam which has a photon energy below the bandgap energy of silicon.

The fundamental beam can originate from a pumped external laser source or can be derived from a laser crystal pumped by a pump source.

In some embodiments, the system can be an intracavity system and the fundamental beam can be produced by an intracavity laser crystal. In some embodiments, the system can be an extracavity system, and the fundamental beam can be produced by a fundamental pump laser.

The means by which the non linear crystal emits THz frequency electromagnetic radiation preferably can include at least one of stimulated polariton scattering, difference frequency generation, parametric generation, optical rectification or Cerenkov methods to produce the THz frequency electromagnetic radiation emission. The fundamental beam can be produced by at least one of: a solid-state laser, a laser diode, a rare-earth-doped laser crystal, an erbium crystal or a VECSEL semiconductor.

In some embodiments, the non linear crystal preferably can include a stimulated polariton scattering (SPS) active crystal. The SPS active crystal preferably can include at least one of lithium niobate ($LiNbO_3$), lithium iodate ($LiO_3$), potassium titanyl phosphate ($KTiOPO_4$/KTP), potassium titanyl arsenate ($KTiOAsO_4$/KTA), rubidium titanyl phosphate ($RbTiOPO_4$/RTP), Gallium Phosphate (GaP), Gallium Arsenide (GaAs) or quartz.

The system operates in a pulsed regime with nanosecond durations, pico-second durations, microsecond duration, millisecond duration, multi-second duration or in the continuous-wave (CW) regime.

The silicon intermediary preferably can include a profiled surface including a periodic repeating cross-section. In some embodiments, the profiled surface can comprise a series of prisms. A single prism can also be used.

In some embodiments, the fundamental beam can be totally internally reflected along a first surface of the non linear crystal near the output emission area of the THz radiation.

The system further preferably can include: a first resonant cavity for resonating the fundamental beam; a second resonant cavity for resonating the Stokes beam. The first and second resonant cavities are preferably angularly offset from one another, such that the corresponding beams intersect within the nonlinear crystal.

In some embodiments, the fundamental beam and the Stokes beam undergo total internal reflection at an overlapping area adjacent the first surface of the non linear crystal.

In accordance with a further aspect of the present invention, there is provided a method of increasing the terahertz output power of a THz frequency electromagnetic radiation generating system, the system including: a THz frequency electromagnetic radiation emission producing source; a silicon intermediary for output channelling the THz frequency electromagnetic radiation emission to an output environment; the method including the steps of: utilizing a fundamental beam photon energy below the band gap energy of silicon to produce THz frequency electromagnetic radiation in the THz frequency electromagnetic radiation emission producing source.

In accordance with a further aspect of the present invention, there is provided a method of increasing the terahertz frequency electromagnetic radiation output power of an intracavity solid state laser which generates terahertz frequency electromagnetic radiation via the non linear stimulated polariton scattering process, with the terahertz frequency electromagnetic radiation output power being formed in a non-linear crystal and being extracted by the utilisation of a silicon intermediary structure between the non-linear crystal and air, the method including the step of: utilizing a fundamental and Stokes wavelength which do not generate free carriers in the silicon intermediary structure.

In accordance with a further aspect of the present invention, there is provided an intracavity solid state laser outputting THz frequency electromagnetic radiation via non linear stimulated polariton scattering, the laser including: a first external pump for pumping a first resonant optical cavity; a first resonant optical cavity including a laser crystal for generating a fundamental beam and resonating the fundamental beam, and a first non linear crystal for interacting with the fundamental beam and thereby producing a Stokes beam; a second resonant optical cavity, for resonating a Stokes beam; wherein the first and second resonant optical cavities are arranged such that the fundamental beam and Stokes beam intersect within the non linear crystal at an angle to achieve phase matching of non linear polariton scattering; and the first resonant optical cavity further resonates a fundamental beam having a photon energy below the band gap of Silicon.

In accordance with a further aspect of the present invention, there is provided a THz frequency electromagnetic radiation generation system including: a non linear crystal producing THz frequency electromagnetic radiation; a first laser beam and a second laser beam that interact with the non linear crystal thereby enabling a THz frequency electromagnetic radiation emission; a silicon intermediary coupled to the non linear crystal for output channeling the THz frequency electromagnetic radiation emission to an output environment; wherein said first and second laser beams each have a photon energy below the bandgap energy.

BRIEF DESCRIPTION OF THE DRAWINGS

Embodiments of the invention will now be described, by way of example only, with reference to the accompanying drawings in which.

DETAILED DESCRIPTION

The first embodiment utilises a "longer than typical" laser wavelength, in the range of 1342-1380 nm, in the SPS process to inhibit the production of free-carriers (electrons and holes) within the silicon (Si) prisms which act to absorb generated THz radiation and hence reduce the overall power that can be typically produced from these systems.

This provides a means for overcoming the free-carrier absorption problem, by using laser wavelengths which do not generate free-carriers in the Si prisms in the first place, i.e. using wavelengths with photon energies below the band gap of Si.

Figure 7:
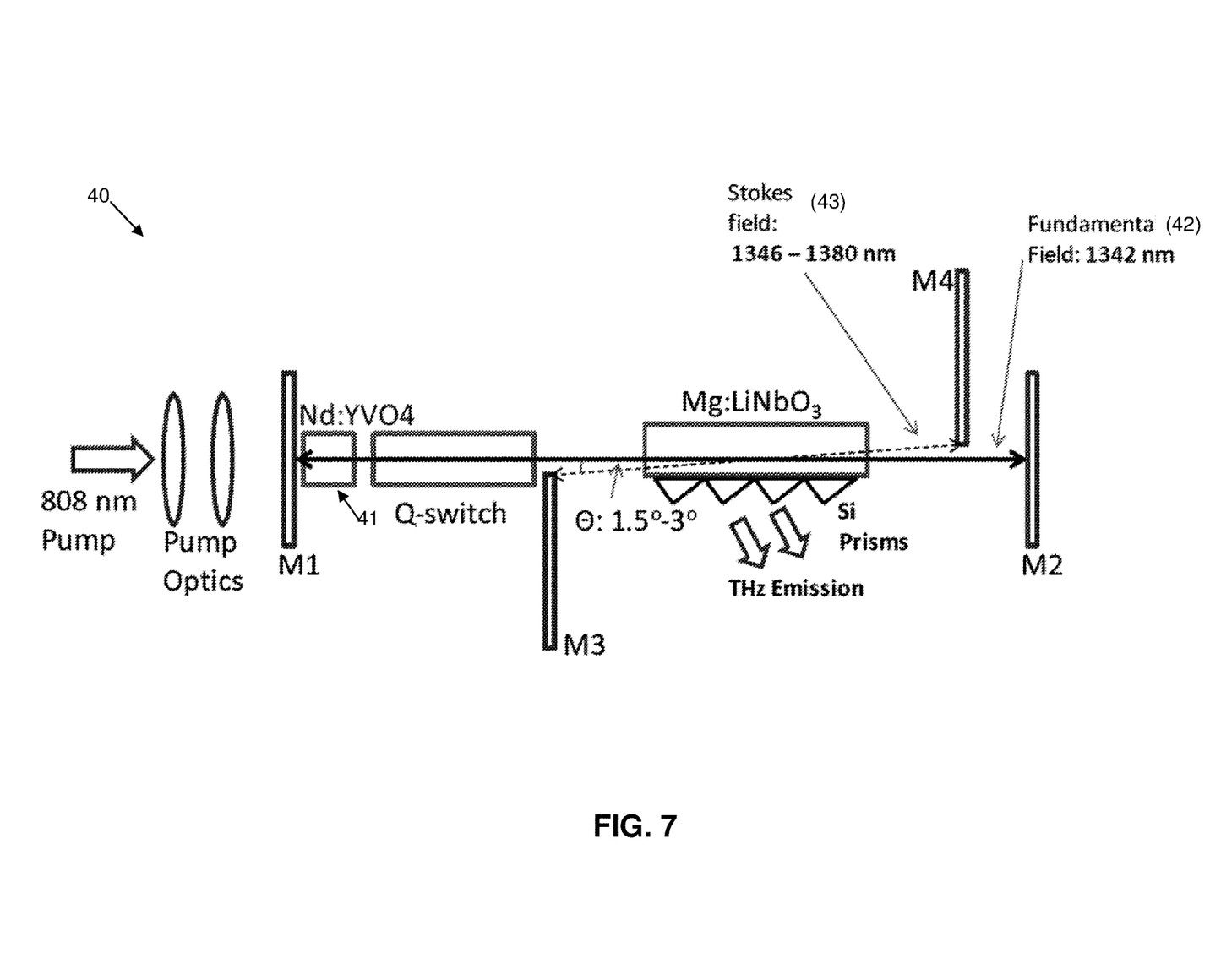
FIG. 7 illustrates schematically the modification embodiment of the invention.

Turning to FIG. 7, the laser oscillation at these longer wavelengths can be achieved by using Nd-doped laser crystals 41 in place of the previous crystal arrangement. These crystals have a laser emission band in the 1300 nm range in addition to the band at ~1064 nm. Nd:YVO$_4$ is particularly well suited to generating strong laser emission at 1342 nm due to its very high emission cross-section in this wavelength range.

An intracavity THz SPS laser using the 1342 nm emission line in Nd:YVO$_4$ was constructed as shown 40 in FIG. 7. This produced a fundamental beam 42 at 1342 nm (0.92 eV) and tunable Stokes emission 43 from ~1346 nm (0.92 eV) to 1380 nm (0.90 eV). The corresponding THz tuning range should be similar to that achieved when using 1064 nm for the same angles between the Stokes and fundamental cavities. To achieve laser operation at this longer wavelength, it was necessary to re-configure the laser system by changing crystal and mirror coatings to suppress the 1064 nm laser line and promote strong oscillation at 1342 nm.

The resulting system successfully exhibited Stokes and THz emissions. Importantly, the THz emission was very strong, and a significant (greater than three-fold) increase in THz power was achieved from a previous design. It was also confirmed that the addition of blocking elements within the cavity had no effect on the THz output, indicating that scattered laser light was having no effect on the Si prisms and no free-carriers were being generated.

It is difficult to perform a direct comparison between the performance of the system operating with 1064 nm and 1342 nm wavelengths simply due to the number of changes that have been made to the system. The mirror coatings are slightly different and the laser crystals are different. However, significantly more THz radiation was detected from the system utilising the 1342 nm fundamental as opposed to 1064 nm field, with more than triple the power being detected at ~1.9 THz.

The embodiment seeks to overcome the free-carrier issue by leveraging upon another strong laser wavelength that is accessible in Nd-doped laser crystals. Even in systems using 1064 nm and blocking elements, there are still questions regarding whether internal scattering of the laser field inside the LN crystal are generating free carriers at the internal Si interface. The arrangement of the preferred embodiment precludes this possibility.

The large gains in THz output power that are realised with this system design/approach are significant in providing higher power levels for THz power generation.

Figure 8:
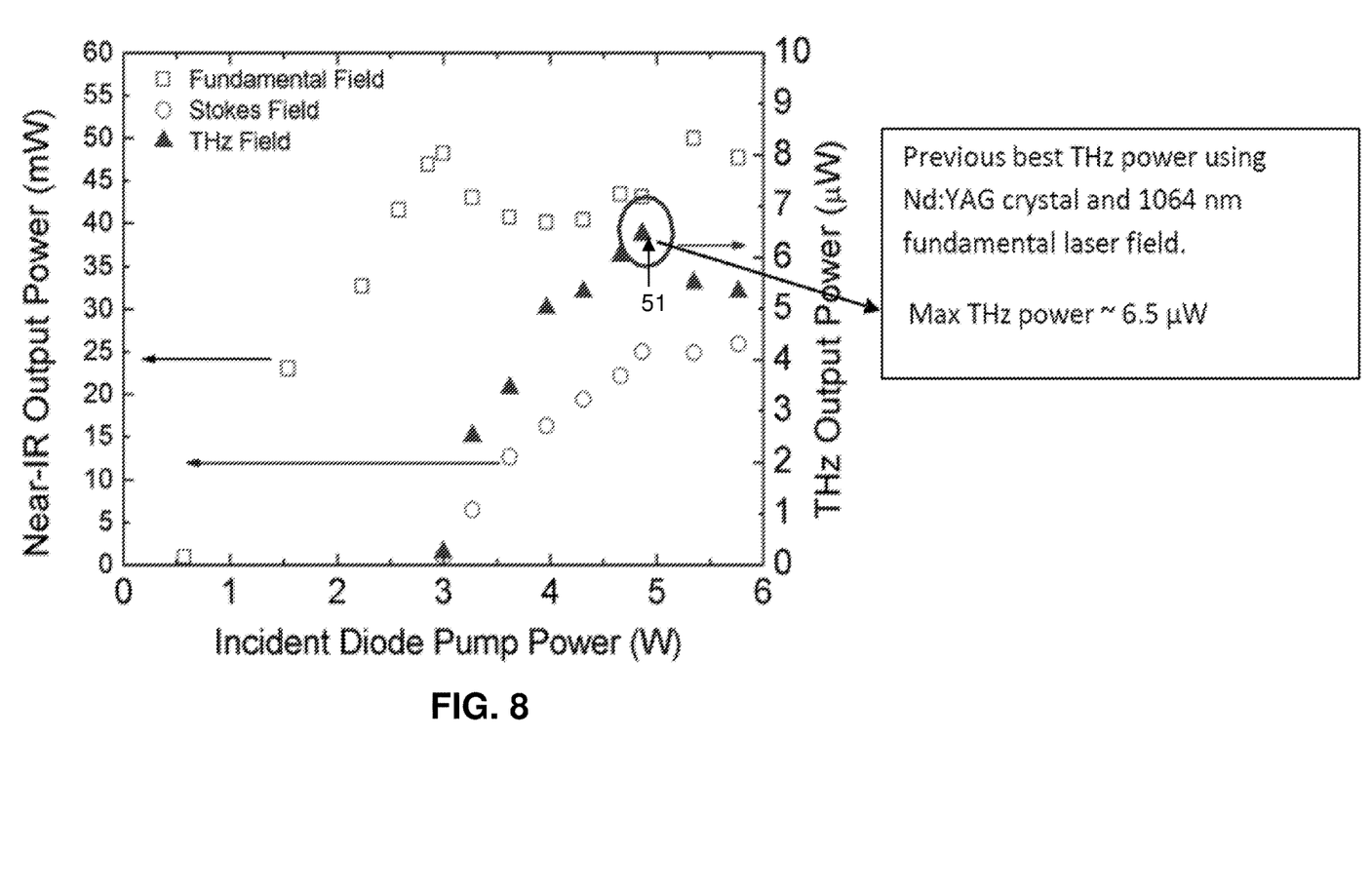
FIG. 8 illustrates a graph of the levels of output power with prior art devices.
Figure 9:
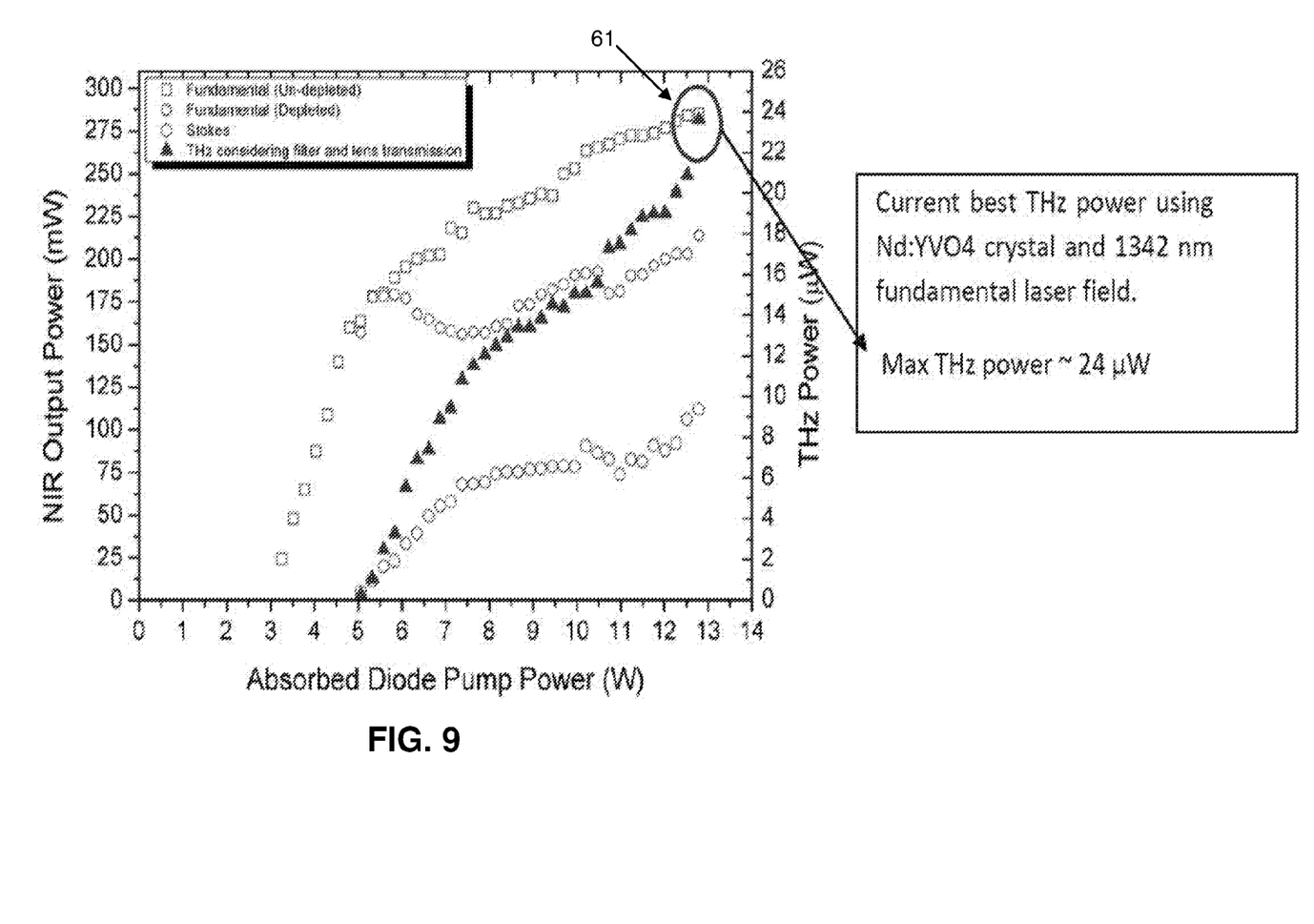
FIG. 9 illustrates a graph of the levels of output power producible with the present embodiment.

Turning now to FIG. 8, there is illustrated the THz output power for differing levels of incident diode pump power for a previous known design, showing a maximum output power 51 of approximately 6.5 µW. Turning to FIG. 9, the arrangement utilising a Nd:YVO4 crystal with a fundamental field wavelength of 1342 nm was found to be about 24 µW 61. It is anticipated that with higher diode laser pumping, even higher THz power can be achieved.

It can therefore be seen that the above embodiment provides a means for substantially increasing the output power in THz power generation through the utilisation of a laser photon energy below the band gap of silicon.

The teachings of the embodiment can be extended to other THz generation systems, where a silicon intermediary is used. In such devices, a photon energy below the band gap of silicon can be used to avoid the presence of free-carriers.

The embodiments thereby extend to different laser configurations based on the SPS process including: intracavity and extracavity THz oscillators (TPOs) and generators (TPGs) as outlined in FIGS. 1 to 3.

These embodiments can also be extended to resonator configurations which are co-linearly and non-co-linearly phase matched and which may include a total internal reflection (TIR) of the fundamental and/or Stokes laser fields inside the SPS crystal.

The alternative embodiments of THz producing systems need not be just SPS-based and may encompass systems using difference-frequency generation.

It will also be evident that lasers with photon energy lower than the band gap of Si can be produced using other laser gain media in addition to Nd-doped crystals. These include thulium (Tm) and erbium (Er)—doped laser crystals for example. In addition to semiconductor media such as vertical-external-cavity surface emitting-laser (VECSEL) chips and disc lasers.

The generation of THz radiation via the SPS process is not limited to lithium niobate ($LiNbO_3$) and can include other SPS-active crystals such as: lithium iodate ($LiO_3$), potassium titanyl phosphate (KTiOPO4/KTP), potassium titanyl arsenate (KTiOAsO4/KTA), rubidium titanyl phosphate (RbTiOPO4/RTP), Gallium Phosphate (GaP), Gallium Arsenide (GaAs), and quartz. In each case, the Silicon intermediary is still utilised for out-coupling of the generated THz radiation.

These SPS lasers can operate in different temporal regimes including: a pulsed regime with nanosecond durations (as per the described embodiment), pico-second durations, microsecond durations, millisecond durations, multi-second durations, or in the continuous-wave (CW) regime.

The invention therefore has general application where it is desired to increase the output of THz frequency power and/or the optical efficiency of a THz emitting source.

A number of other arrangements are possible. For example, there will now be described a 'shallow-bounce' configuration of a THz emission laser resonator design which can facilitate more efficient generation of THz radiation within the SPS crystal, and more efficient extraction of the generated THz radiation from the SPS crystal.

Figures 10, 11:
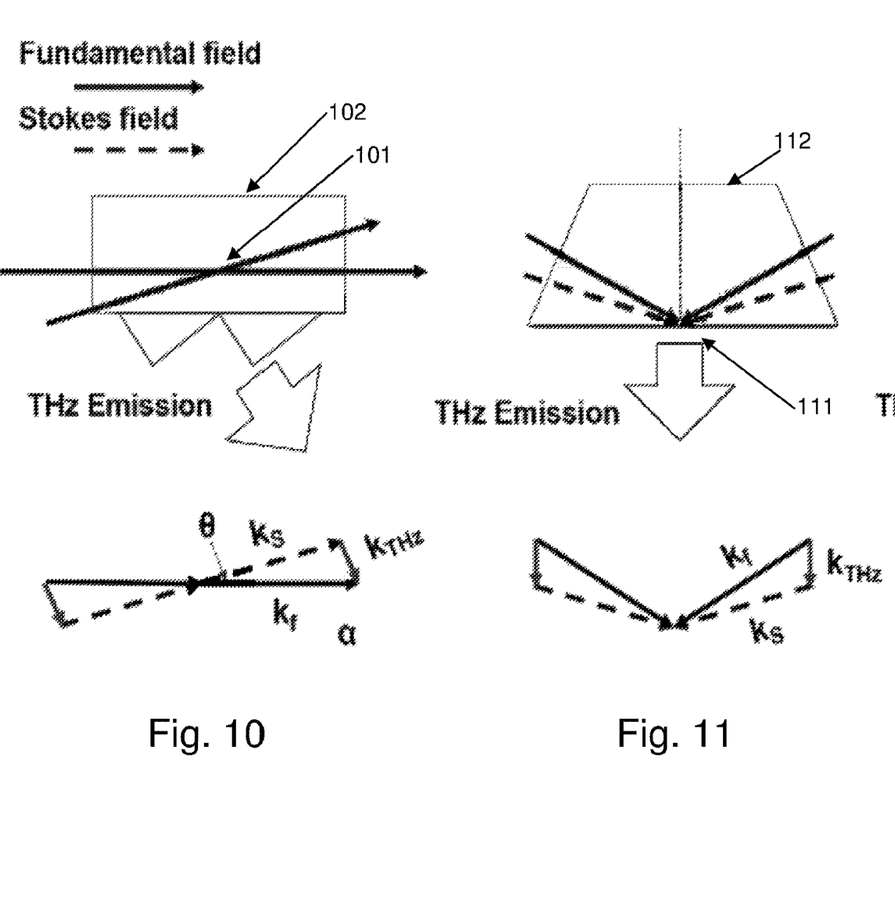
FIG. 10 is a schematic diagram of a linear resonator configuration.
FIG. 11 is a schematic diagram of a surface emitting configuration.
Figure 12:
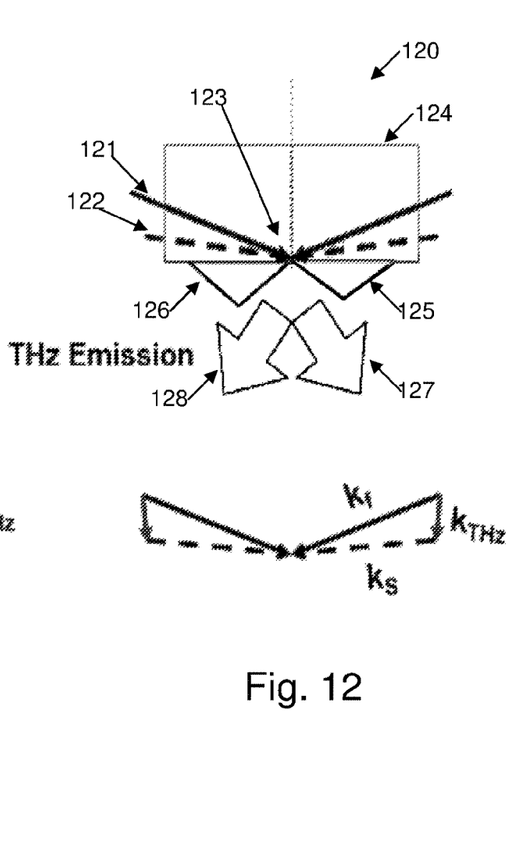
FIG. 12 is a schematic diagram of a shallow bounce configuration.

In FIG. 10 to FIG. 12, three different emission configurations are shown. FIG. 10 illustrates the operational relationship of FIG. 7 is a substantially simplified form, illustrating the in crystal overlap 101 between the stokes beam and the fundamental beam. FIG. 11 illustrates an alternative arrangement providing a field overlap at the surface 111 of crystal 112. In FIG. 12 there is illustrated the further shallow bounce configuration. In the shallow bounce configuration 120 depicted, both the fundamental 121 and Stokes fields 122 are totally internally reflected 123 within the SPS crystal 124. As a result, the overlapping region 123 between these two beams, and consequently the region in which the THz beam is generated, is extremely close to the surface of the SPS crystal. This means that any THz radiation generated in this configuration does not have to propagate through a significant bulk of the SPS crystal and suffer absorption losses within the SPS crystal, as it does in the linear configuration. The shallow bounce configuration 124 also provides for the use of silicon prisms e.g. 125, 126 for out-coupling of the THz radiation 127, 128 and hence benefits from the use of a 1342 nm fundamental wavelength.

Another characteristic of the surface-emitting configuration is that two spatially separated THz beams 127, 128 are emitted from the system. This may have utility in pump-probe systems or interferometers.

In the shallow bounce configuration, the system may operate with either: i) the fundamental field undergoing a TIR bounce, and the Stokes field not being bounced and remaining liner; ii) the fundamental field being linear and the Stokes field undergoing a TIR bounce; iii) both the fundamental and Stokes fields undergoing a TIR bounce.

Figure 13:
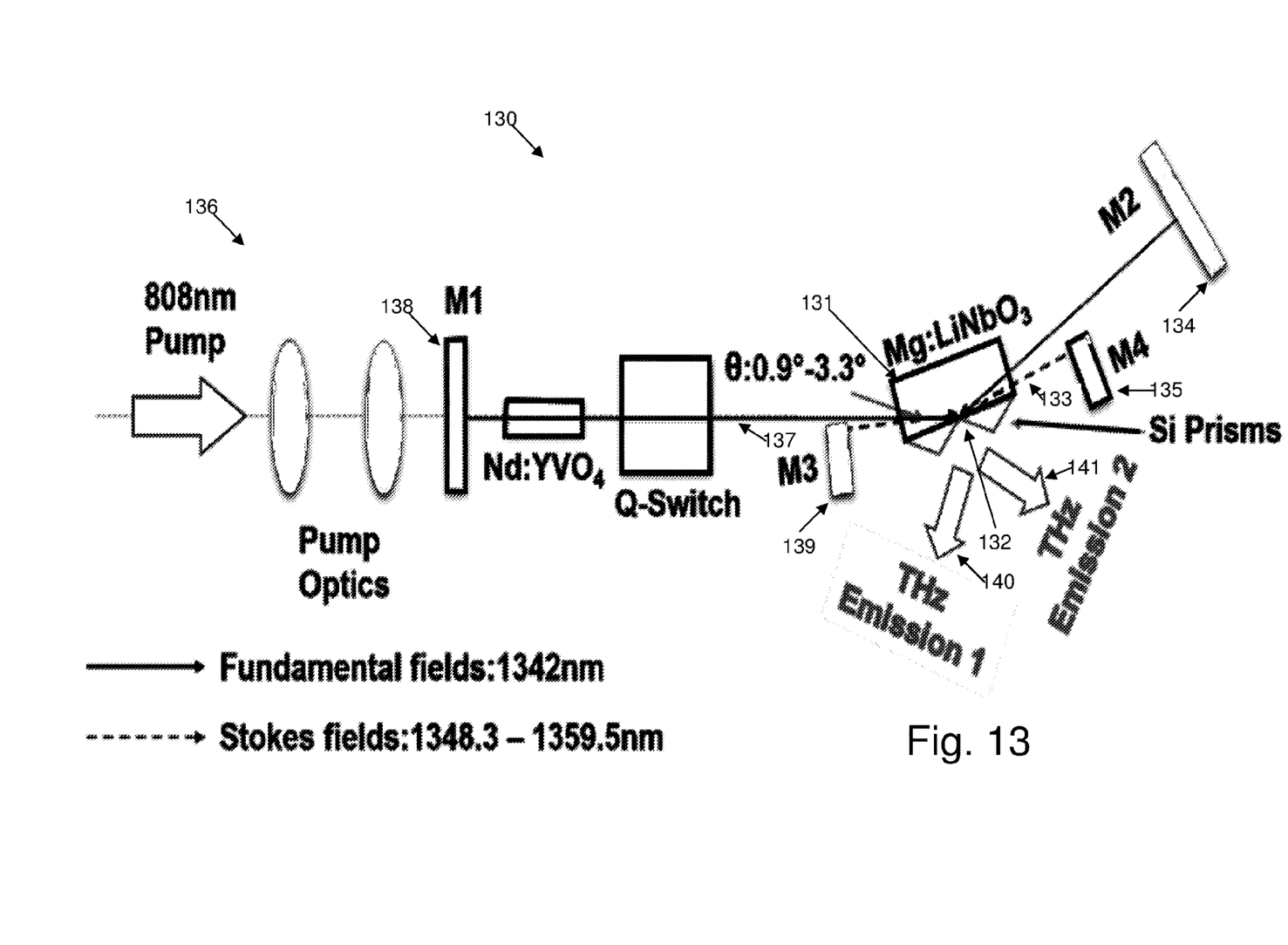
FIG. 13 illustrates schematically an intra-cavity shallow-bounce configuration layout.

FIG. 13 illustrates one form of modification of the arrangement of FIG. 7 to account for a shallow bounce configuration. In this arrangement, as previously discussed, the initial pump laser and optics 136 are used to pump the fundamental field creation crystal to create fundamental field 137. The fundamental field is projected through crystal 131 where it is totally internally reflected 132 and resonates via cavity mirrors 134, 138. The fundamental field drives a stokes field 133 which resonates between mirrors 135, 139, and is also totally internally reflected at the point 132. The overlapping fields produce dual THz frequency emissions 140, 141.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A THz frequency electromagnetic radiation generation system including:
   a non linear crystal producing THz frequency electromagnetic radiation;
   a fundamental beam that interacts with the non linear crystal thereby enabling a THz frequency electromagnetic radiation emission;
   a silicon intermediary coupled to the non linear crystal for output channeling the THz frequency electromagnetic radiation emission to an output environment;
   said system utilizing the fundamental beam which has a photon energy below the bandgap energy of silicon.

2. A system as claimed in claim 1 wherein the photon energy of the fundamental beam originates from a pumped external laser source or is derived from a laser crystal pumped by a pump source.

3. A THz frequency electromagnetic radiation generation system as claimed in claim 1 wherein said system is an intracavity system and the fundamental beam is produced by an intracavity laser crystal.

4. A THz frequency electromagnetic radiation generation system as claimed in claim 1 wherein said system is an extracavity system, and the fundamental beam is produced by a fundamental pump laser.

5. A system as claimed in claim 1 wherein the means by which the non linear crystal emits THz frequency electromagnetic radiation includes at least one of stimulated polariton scattering, difference frequency generation, parametric generation, optical rectification or Cerenkov emission to produce the THz frequency electromagnetic radiation emission.

6. A system as claimed in claim 1 wherein said fundamental beam is produced by at least one of: a solid-state laser, a laser diode, a rare-earth-doped laser crystal, or a VECSEL semiconductor.

7. A system as claimed in claim 1 wherein said non linear crystal includes a stimulated polariton scattering (SPS) active crystal.

8. A system as claimed in claim 7 wherein said SPS active crystal includes at least one of lithium niobate ($LiNbO_3$), lithium iodate ($LiO_3$), potassium titanyl phosphate (KTiOPO4/KTP), potassium titanyl arsenate (KTiOAs04/KTA), rubidium titanyl phosphate (RbTiOPO4/RTP), Gallium Phosphate (GaP), Gallium Arsenide (GaAs) or quartz.

9. A system as claimed in claim 1 wherein said system operates in a pulsed regime with nanosecond durations, pico-second durations, microsecond durations, millisecond durations, multi-second duration or in the continuous-wave (CW) regime.

10. A system as claimed in claim 1 wherein the silicon intermediary includes a profiled surface including a periodic repeating cross-section.

11. A system as claimed in claim 10 wherein said profiled surface comprises a series of prisms.

12. A system as claimed in claim 1 wherein the fundamental beam is totally internally reflected along a first surface of the non linear crystal near the output emission area of the THz radiation.

13. A system as claimed in claim 1 wherein said system further includes:
   a first resonant cavity for resonating the fundamental beam; and
   a second resonant cavity for resonating the Stokes beam.

14. A system as claimed in claim 13 wherein said first and second resonant cavities are angularly offset from one another such that beams resonating within the first and second cavities intersect within the nonlinear crystal.

15. A system as claimed in claim 14 wherein at least one of said fundamental beam and said Stokes beam undergo total internal reflection at a first surface of the non linear crystal.

16. A method of increasing the terahertz output power of a THz frequency electromagnetic radiation generating system, the system including:
   a THz frequency electromagnetic radiation emission producing source;
   a silicon intermediary for output channelling the THz frequency electromagnetic radiation emission to an output environment;
   the method including the steps of:
   utilizing a fundamental beam photon energy below the band gap energy of silicon to produce THz frequency electromagnetic radiation in the THz frequency electromagnetic radiation emission producing source.

17. A method of increasing the terahertz frequency electromagnetic radiation output power of an intracavity solid state laser which generates terahertz frequency electromagnetic radiation via the non linear stimulated polariton scattering process, with the terahertz frequency electromagnetic radiation output power being formed in a non-linear crystal and being extracted by the utilization of a silicon intermediary structure between the non-linear crystal and air, the method including the step of:
   utilizing a fundamental and Stokes wavelengths which do not generate free carriers in the silicon intermediary structure.

18. A method as claimed in claim 17 wherein the fundamental is generated by a Nd-doped laser crystal.

19. A method as claimed in claim 17 wherein any fundamental emissions from the Nd-doped laser crystal are suppressed by the intracavity solid state laser.

20. An intracavity solid state laser outputting THz frequency electromagnetic radiation via non linear stimulated polariton scattering, the laser including:
   a first external pump for pumping a first resonant optical cavity;
   a first resonant optical cavity including an optical crystal and a first non linear crystal and resonating the fundamental beam and thereby producing a Stokes beam;
   a second resonant optical cavity, for resonating a Stokes beam; wherein
   said first and second resonant optical cavities are arranged such that the fundamental beam and Stokes beam intersect within the non linear crystal at an angle to achieve phase matching of non linear polariton scattering; and
   said first resonant optical cavity further resonates a fundamental beam having a photon energy below the band gap of Silicon.

21. A laser as claimed in claim 20 wherein said optical crystal comprises an Nd-doped laser crystal.

22. A THz frequency electromagnetic radiation generation system as claimed in claim 1 wherein:
   the fundamental beam is a first laser beam, and the first laser beam and a second laser beam interact with the non linear crystal thereby enabling a THz frequency electromagnetic radiation emission; and
   said second laser beam has a photon energy below the bandgap energy of silicon.

* * * * *